United States Patent [19]

Barbee

[11] 4,009,901
[45] Mar. 1, 1977

[54] DISCONNECT AND STORAGE MEANS FOR A WINDSHIELD WIPER ARM ASSEMBLY

[75] Inventor: Gail G. Barbee, Montgomery, Ill.
[73] Assignee: Caterpillar Tractor Co., Peoria, Ill.
[22] Filed: Aug. 27, 1975
[21] Appl. No.: 608,296
[52] U.S. Cl. .................. 296/28 C; 15/250.16; 15/250.34; 192/67 R; 192/65
[51] Int. Cl.² ................................ B60S 1/34
[58] Field of Search .............. 15/250.16–250.19, 15/250.31–250.35; 296/28 C; 403/368, 365, 359; 74/527; 192/67 R, 65

[56] References Cited

UNITED STATES PATENTS

| | | | |
|---|---|---|---|
| 1,787,893 | 1/1931 | Burke | 15/250.16 |
| 2,738,535 | 3/1956 | Horton | 15/250.34 |
| 3,419,299 | 12/1968 | Oishei | 15/250.34 X |
| D157,942 | 4/1950 | Collin | 296/28 C |

Primary Examiner—Peter Feldman
Attorney, Agent, or Firm—Phillips, Moore, Weissenberger, Lempio & Majestic

[57] ABSTRACT

A windshield wiper arm assembly comprises a shaft mounted for oscillation on an operator's cab or a vehicle, adjacent to a windshield thereof. The wiper arm is normally coupled to the shaft and retained at a first position thereon by a spring clip, for oscillation therewith. Upon release of the spring clip from the shaft, the wiper arm may be moved axially to a second position on the shaft whereby the shaft is free to oscillate relative to the wiper arm. A storage clip is secured to the operator's cab to retain the wiper arm in its second, inoperative position.

9 Claims, 4 Drawing Figures

DISCONNECT AND STORAGE MEANS FOR A WINDSHIELD WIPER ARM ASSEMBLY

BACKGROUND OF THE INVENTION

This invention relates to a windshield wiper arm assembly particularly adapted for use on an operator's cab of a construction vehicle. The cab may comprise a pair of adjacent upper and lower windows each equipped with a wiper arm assembly for wiping the windows in the event of rain or the like. Should the operator desire to open the lower windshield, the wiper arm associated therewith must be removed from the oscillatory shaft to which it is attached.

SUMMARY OF THIS INVENTION

An object of this invention is to provide a non-complex and economical means for normally coupling a wiper arm to a shaft for oscillation therewith and for disconnecting the wiper arm from the shaft expeditiously. In the preferred embodiment of this invention, the wiper arm is normally coupled to the shaft and retained at a first position thereon by a retaining clip and is adapted to be moved to a second, inoperative position upon removal of the reatining clip from the shaft.

BRIEF DESCRIPTION OF THE DRAWINGS

Other objects of this invention will become apparent from the following description and accompanying drawings wherein.

DETAILED DESCRIPTION

Figure 1:
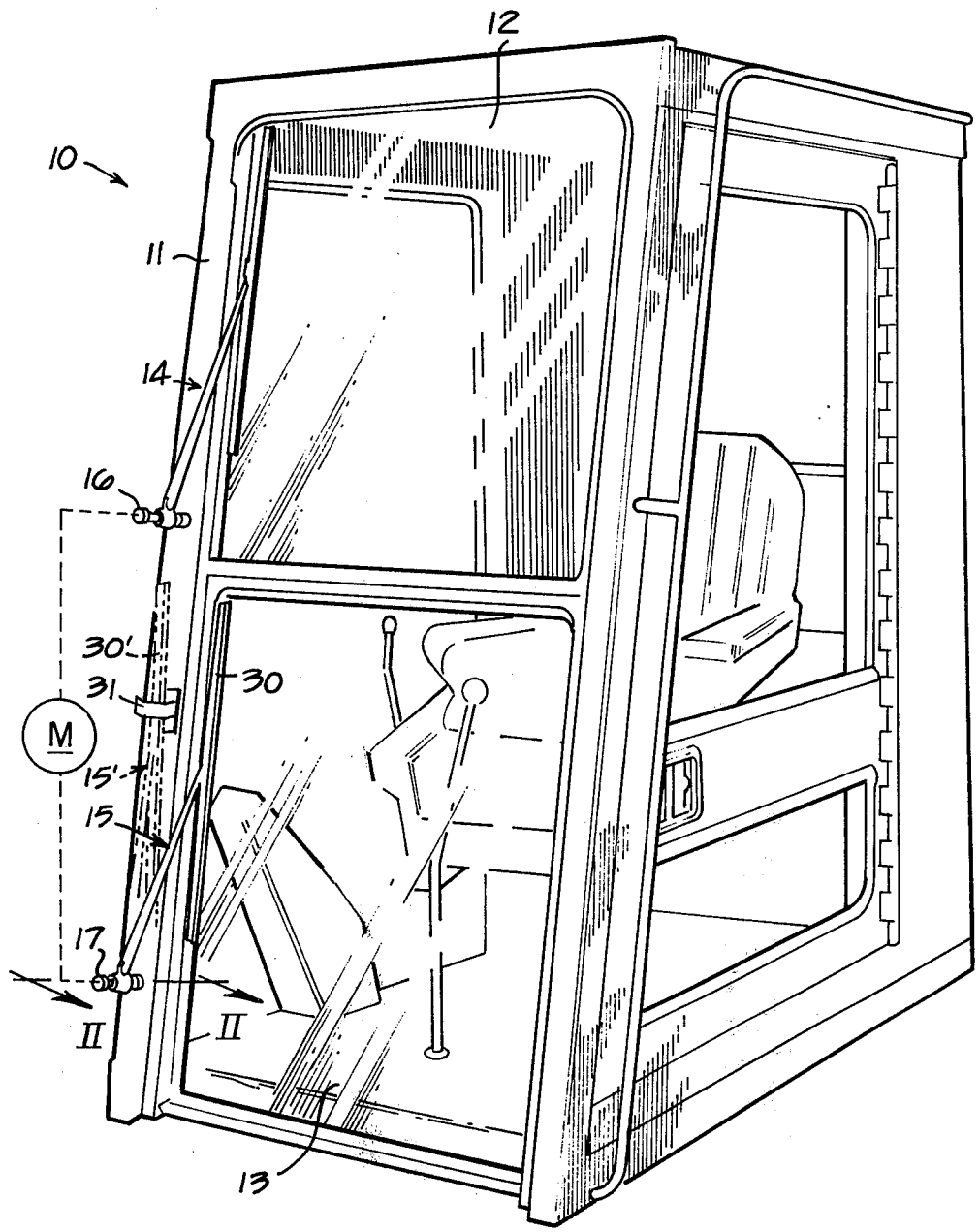
FIG. 1 is a perspective view of an operator's cab having a windshield wiper arm assembly of this invention mounted thereon.

FIG. 1 illustrates an operator's cab 10, adapted to be mounted on a construction vehicle or the like, comprising a frame structure 11 having a pair of upper and lower windshields 12 and 13 mounted thereon. A pair of windshield wiper arm assemblies 14 and 15 are mounted on a side of the frame for selectively wiping the windows in a conventional manner. In particular, shafts 16 and 17 of the respective assemblies are operatively connected to a common drive motor 18 for oscillation thereby.

Lower window 13 is slidably mounted on frame 11 to be opened by the operator during selected phases of vehicle operation. Conventional windshield wiper arm assemblies require that the wiper arm 15 be removed from shaft 17 which is adapted for simultaneous oscillation along with shaft 16 of the upper wiper arm assembly. This invention is drawn to means for normally coupling wiper arm 15 to shaft 17 and for selectively moving the wiper arm to an inoperative position on the shaft whereby the shaft is permitted to oscillate relative to the wiper arm.

Figure 2:
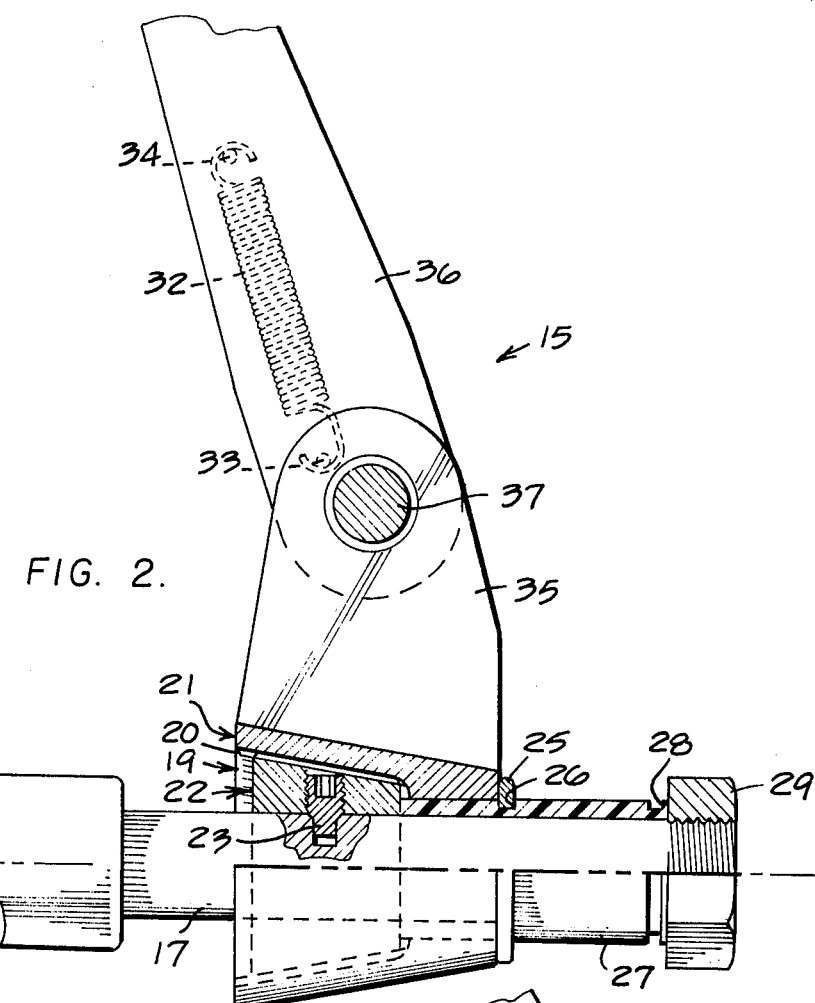
FIG. 2 is an enlarged and partially sectioned side elevational view of the wiper arm assembly, taken in the direction of arrows II—II in FIG. 1.
Figure 4:
FIG. 4 is a top plan view of a retaining clip employed in the wiper arm assembly.

Referring to FIG. 2, such means comprises a releasable coupling means 19 for normally mechanically coupling wiper arm 15 to shaft 17 when the wiper arm is disposed at a first position thereon relative to longitudinal axis X thereof. The coupling means comprises serrations 20 formed internally on a frusto-conically shaped mounting sleeve 21 of the wiper arm and a like-shaped retaining member 22 secured to the shaft by a set screw 23 and having serrations 24 formed externally thereon to frictionally engage the other serrations.

Retaining means, preferably in the form of an expandable stainless steel spring clip 25, abuts an outboard end of the wiper arm to retain it in such first position. The retaining clip is disposed in a first annular groove 26 formed on a plastic cylindrical bearing sleeve 27, having its first end abut member 22, mounted on shaft 17 and forming part thereof. A second annular groove 28 is formed in axially spaced relationship from the first groove on the sleeve and the sleeve is held in place on the shaft by a nut 29 threadably mounted on an outboard end thereof to abut a second end of the sleeve.

Figure 3:
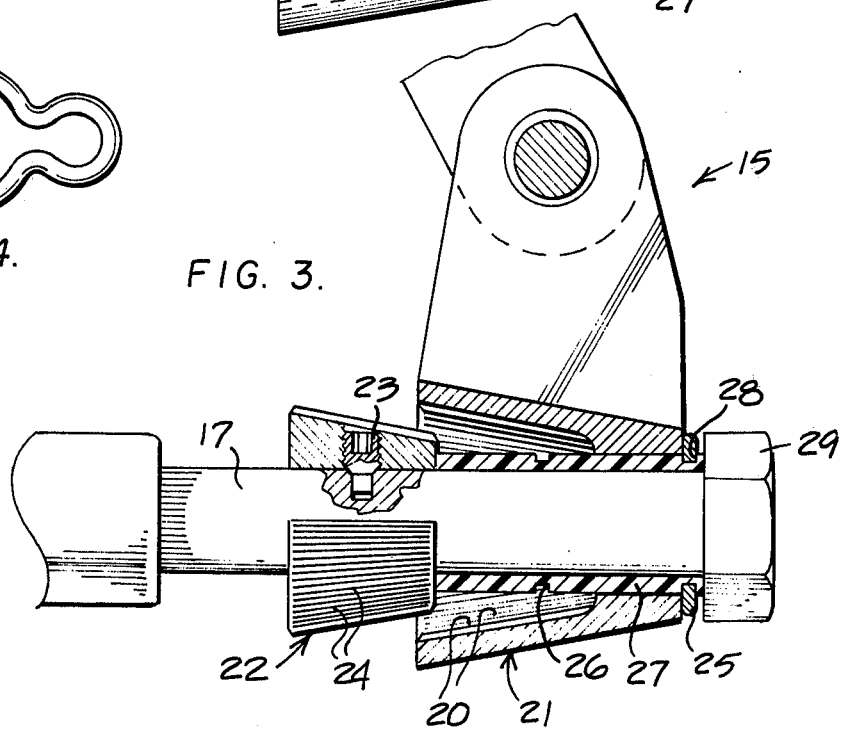
FIG. 3 is a view similar to FIG. 2, but showing the wiper arm assembly in an operative condition thereof.

When it is desired to uncouple wiper arm 15 from shaft 17 to store it in its 15' position illustrated in FIG. 1, spring clip 25 is removed from groove 26 and the wiper arm is pulled outwardly on the shaft to its FIG. 3 position. The spring clip may be seated in storage groove 28, as shown, and a blade 30 of the wiper arm may be inserted behind a storage clip means 31 secured to frame 11.

A standard tension spring 32 (FIG. 2), normally employed with such wiper arm to urge blade 30 into wiping contact with windshield 13, will function to retract and retain the blade behind storage clip means 31. In particular, the spring is mounted between pins 33 and 34, secured to a mounting bracket 35 of sleeve 21 and an arm 36 of wiper arm 15, having blade 30 mounted thereon. The spring is mounted in over-center relationship relative to a pin 37 secured to bracket 35 and which pivotally mounts arm 36 thereon to retract the arm leftwardly in FIG. 2.

I claim:
1. A windshield wiper arm assembly comprising
   an elongated shaft adapted to oscillate about a longitudinal axis thereof,
   a wiper arm movably mounted on said shaft for selective longitudinal displacement between first and second positions thereon,
   means for normally coupling said wiper arm to said shaft for simultaneous oscillation therewith when said wiper arm is disposed at said first position and for permitting said shaft to oscillate relative to said shaft when said wiper arm is moved to said second position,
   an operator's cab comprising a frame and a windshield mounted on said frame to be moved between opened and closed positions thereon and wherein said wiper arm assembly is mounted on a side of said frame adjacent to said windshield,
   clip means secured on the side of said frame for retaining said wiper arm in the second position thereof on said frame and remote from said windshield retaining means releasable mounted in a groove on said shaft and abutting an outboard end of said wiper arm to retain it in its first position on said shaft, and
   a second groove formed on said shaft in axially spaced relationship relative to said first-mentioned groove to retain said wiper arm in its second position.

2. The wiper arm assembly of claim 1 wherein said operator's cab further comprises a second upper windshield mounted above said first-mentioned lower windshield and wherein said wiper arm assembly is mounted on said frame adjacent to said lower windshield and a second wiper arm assembly is mounted on said frame adjacent to said upper windshield.

3. The wiper arm assembly of claim 2 further comprising a common motor means operatively connected to said wiper arm assemblies for selectively oscillating shafts thereof simultaneously when the wiper arm of said first-mentioned wiper arm assembly is in its first position.

4. The wiper arm assembly of claim 1 wherein said means comprises releasable coupling means comprising a pair of frusto-conically shaped members normally mechanically connecting said wiper arm to said shaft.

5. The wiper arm assembly of claim 1 wherein said members comprise a mounting sleeve of said wiper arm and a retaining member secured to said shaft, said mounting sleeve having serrations formed internally thereon and said retaining member having serrations formed externally thereon and frictionally engaging the first-mentioned serrations.

6. The wiper arm assembly of claim 5 wherein said shaft comprises a bearing sleeve mounted thereon to abut said retaining member at a first end thereof and wherein said mounting sleeve is slidably mounted on said bearing sleeve.

7. The wiper arm assembly of claim 6 further comprising a nut threadably mounted on an outboard end of said shaft and abutting a second end of said bearing sleeve.

8. The wiper arm assembly of claim 6 wherein said bearing sleeve has a pair of axially spaced first and second annular grooves formed thereof and retaining means releasably retained in said first groove for retaining said wiper arm in its first position and adapted to be released from said first groove and disposed in said second groove upon movement of said wiper arm to its second position.

9. The wiper arm assembly of claim 1 wherein said retaining means constitutes an expandable spring clip.

* * * * *